United States Patent
Kreuter et al.

(10) Patent No.: US 9,755,425 B2
(45) Date of Patent: Sep. 5, 2017

(54) POWER SWITCH DEVICE

(71) Applicant: Infineon Technologies AG, Neubiberg (DE)

(72) Inventors: Hans-Peter Kreuter, Villach (AT); Christian Djelassi, Villach (AT)

(73) Assignee: Infineon Technologies AG, Neubiberg (DE)

( * ) Notice: Subject to any disclaimer, the term of this patent is extended or adjusted under 35 U.S.C. 154(b) by 440 days.

(21) Appl. No.: 14/229,015

(22) Filed: Mar. 28, 2014

(65) Prior Publication Data

US 2015/0280425 A1    Oct. 1, 2015

(51) Int. Cl.

| H02H 3/08 | (2006.01) |
|---|---|
| H02H 3/00 | (2006.01) |
| H02H 9/02 | (2006.01) |
| H02H 3/02 | (2006.01) |
| H02H 3/087 | (2006.01) |

(52) U.S. Cl.
CPC .............. *H02H 9/02* (2013.01); *H02H 3/006* (2013.01); *H02H 3/025* (2013.01); *H02H 3/08* (2013.01); *H02H 3/087* (2013.01)

(58) Field of Classification Search
CPC .......... H02H 3/085–3/087; H02H 9/02; H02H 9/025; H02H 3/006; H02H 3/08
See application file for complete search history.

(56) References Cited

U.S. PATENT DOCUMENTS

| 7,449,778 B2 | 11/2008 | Sander |
| 7,719,234 B2 | 5/2010 | Carrier et al. |
| 2007/0206338 A1 | 9/2007 | Ishino |
| 2010/0309690 A1* | 12/2010 | Kawabe ............ H02M 3/33507 363/21.01 |
| 2011/0063879 A1* | 3/2011 | Murata ............. H02M 3/33523 363/21.13 |
| 2012/0147630 A1* | 6/2012 | Cao ........................ H02M 1/32 363/21.15 |
| 2013/0234525 A1* | 9/2013 | Nord ...................... H02M 3/158 307/99 |
| 2014/0184183 A1* | 7/2014 | Tanaka ................ H03K 17/0822 323/274 |
| 2014/0253083 A1* | 9/2014 | Shao ........................ H02M 1/32 323/285 |
| 2015/0054496 A1* | 2/2015 | Kim .................... G01R 31/2841 324/157 |

FOREIGN PATENT DOCUMENTS

| CN | 1864300 A | 11/2006 |
| CN | 1989467 A | 6/2007 |
| CN | 101114642 A | 1/2008 |
| CN | 103325246 A | 9/2013 |

OTHER PUBLICATIONS

Nelhiebel, M. et al., "A reliable technology concept for active power cycling to extreme temperatures," ESREF 2011: 22nd European Symposium on Reliability of Electron Devices, Failure Physics and Analysis, Oct. 3-7, 2011, 4 pp.

Office Action, in the Chinese language, from counterpart Chinese Application No. 201510138592.8, dated Jun. 14, 2017, 9 pp.

\* cited by examiner

*Primary Examiner* — Thienvu Tran
*Assistant Examiner* — Christopher Clark
(74) *Attorney, Agent, or Firm* — Shumaker & Sieffert, P.A.

(57) ABSTRACT

Power switch devices having an overload limit are provided. The overload limit may be adjusted based on an inductance coupled with the power switch device.

19 Claims, 9 Drawing Sheets

POWER SWITCH DEVICE

TECHNICAL FIELD

The present application relates to power switch devices and to corresponding methods.

BACKGROUND

Power switches are conventionally used to couple a load with a supply voltage. In recent years, "smart" power switch devices have been developed which are equipped with one or more diagnostic abilities and protection features, for example against overload and short circuit events. For example, in such power switch devices as a power switch a MOS transistor may be used, and the switch may be opened (i.e. caused to be non-conducting between terminals of the switch) in case of overload or short circuit events.

In some applications, after a switch has been opened for example due to an overload or short circuit event, a retry is required, i.e. the switch closes again. For example, in some automotive applications a light bulb may be coupled to a power switch device. As long as a filament of the light bulb is cold, a resistance of the filament is very low, which resembles a short circuit. In this case, the power switch device may open and then close again for a retry after some predetermined time. In some applications, with each retry the filament may be heated more until its resistance is sufficiently high to keep the switch closed. However, in case of for example a real short circuit in some implementations of power switch devices retries may be made a plurality of times (or even for an essentially indefinite number of times), which causes a high repetitive stress to the power switch device, which may eventually lead to failures of the power switch device.

DETAILED DESCRIPTION

Figure 1:
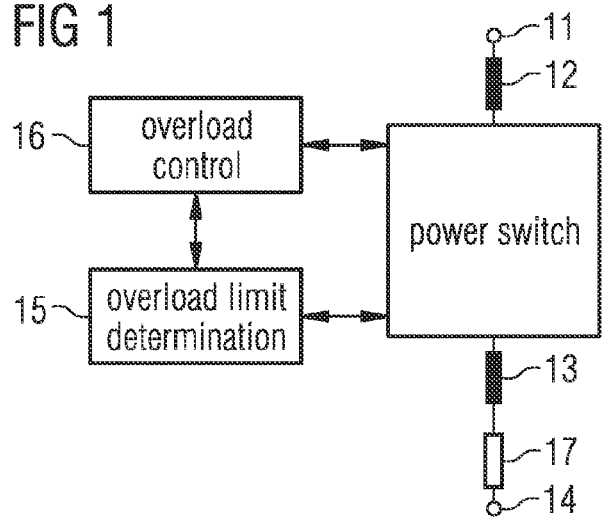
FIG. 1 is a schematic diagram of a power switch device according to an embodiment.

In the following, various embodiments will be described in detail with reference to the attached drawings. It is to be noted that these embodiments serve as illustrative examples only and are not to be construed as limiting the scope of the present application. For example, while an embodiment may be described as comprising a plurality of features or elements, this serves for illustration only, and in other embodiments some of these features or elements may be omitted and/or replaced by alternative features or elements. Furthermore, in some embodiments additional features or elements in addition to those described or shown in the drawings may be provided without departing from the scope of the present application. Also, features or elements from different embodiments may be combined with each other to form further embodiments.

Any connections or couplings, in particular electrical connections or couplings, shown in the drawings or described herein may be implemented as direct connections or couplings, i.e. as connections or couplings without intervening elements, or as indirect connections or couplings, i.e. connections or couplings with one or more intervening elements, as long as the general function of the connection or coupling, for example to transmit a certain kind of information, is essentially maintained. Connections or couplings may be implemented as wire-based connections or couplings or as wireless connections or couplings, or mixtures thereof.

Some embodiments relate to power switches having a shutdown or overload limit, in the following simply referred to as overload limit. When a given quantity, for example a voltage, a current or a temperature, reaches the overload limit, the power switch is opened, to become essentially non-conducting between terminals. In some embodiments, an inductivity of one or more inductive loads coupled to the power switch, for example including an inductivity caused by wiring, is estimated, and the overload limit is set or adjusted depending on the determined inductivity. A determination of the inductivity may in some embodiments be performed at a first shutdown of a series of shutdowns. Such a series may for example occur when after a shutdown, i.e. an opening of the power switch, a retry is performed, for example a closing of the power switch for example a certain time after the opening of the power switch.

Generally, in the context of the present application power switches may be described as comprising one or more control terminals and two or more load terminals. An opening and closing of the power switch may be controlled by applying one or more signals to the one or more control terminals. When the power switch is closed, it provides a low-ohmic connection between at least two of its load terminals, such that current may flow between the load terminals. When the switch is opened, the power switch exhibits a blocking behavior between its load terminals, i.e. is high-ohmic, such that essentially no current may flow between the load terminals (with the exception of undesired effects like leakage current etc., which may occur in real devices).

In some embodiments, the power switch may be implemented using a field effect transistor like a MOS transistor. In such a case, the load terminals may correspond to source and drain terminals of the field effect transistor, and the control terminal may correspond to a gate terminal of the field effect transistor.

Turning now to the Figures, FIG. 1 shows a schematic block diagram of a power switch device according to an embodiment. The power switch device of FIG. 1 comprises a power switch 10. A first load terminal of power switch 10 is coupled with a first supply voltage 11, for example a positive supply voltage. An inductivity 12 represents an inductivity of the coupling, for example wiring, between power switch 10 and first supply voltage 11. A second load terminal of power switch 10 is coupled with a load 17, which in turn is coupled with a second supply voltage 14, for example ground or a negative supply voltage. An inductivity 13 represents an inductivity of a coupling between load 17 and power switch 10, for example an inductivity of a wiring. Furthermore, in some cases also load 17 may have a non-negligible inductivity. Therefore, in the example of FIG. 1, a total inductivity coupled to power switch 10 may essentially be given by inductivities 12 and 13 as well as an inductivity of load 17. In some applications, one or more of these inductivities may be negligible.

A control terminal of power switch 10 is coupled to an overload control 16. Overload control 16 may be configured to open power switch 10 under certain conditions, for example when a overload limit is reached regarding for example a voltage drop over the power switch, a current flowing through the power switch, and/or a temperature of the power switch. Other criteria for shutdown, i.e. opening of the power switch, may be used as well. In some cases, as will be explained later in some more detail, opening the power switch may cause an energy stored in inductivities 12 and 13 or other inductivities coupled to power switch 10 to be "discharged", in particular clamped, via the power switch. For this clamping, as will be explained later a specific clamping circuitry like a Zener diode may be provided, or inherent properties of the power switch like an inherent reverse biased diode which may break through may be used. Therefore, in some cases for larger inductivities 12, 13 (or inductivities of load 17), larger currents may flow when opening the switch until the discharging is finished.

In some embodiments, the above-mentioned overload limit is determined by an overload limit determination circuit 15. In embodiments, overload limit determination circuit 15 may be configured to set the above-mentioned overload limit depending on an inductivity, for example a total inductivity, coupled to power switch 10. For example, the overload limit may be decreased for higher inductivities. In some embodiments, the inductivity may be estimated based on a time duration of a voltage across power switch device being above a limit, for example during a first shutdown. In subsequent shutdown, for example due to retries, then a new overload limit determined by overload limit determination circuit 15 may be used.

Figure 2:
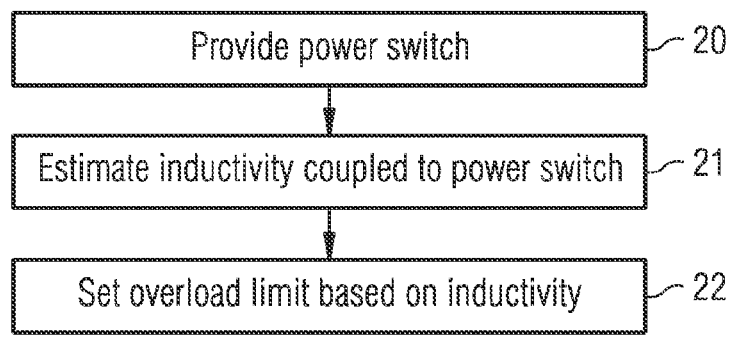
FIG. 2 is a flowchart illustrating a method according to an embodiment.

In FIG. 2, a flowchart illustrating a method according to an embodiment is shown. It should be noted that the method of FIG. 2 serves only as an example for a method, and in other embodiments other methods, for example methods including additional acts or events to the ones described or methods including alternative acts or events to the ones described, may be provided.

At 20 in FIG. 2, a power switch is provided. For example, in some embodiments a power switch comprising a field effect transistor like a MOSFET may be provided, although in other embodiments other kinds of switches may be used.

At 21, an inductivity coupled to the power switch is estimated, for example based on a time measurement during a shutdown. At 22, an overload limit adjusted is based on the inductivity. When a quantity like a voltage or a current associated with the overload limit reaches the overload limit, for example the power switch may be opened.

The method of the embodiment of FIG. 2 may for example be implemented using the power switch device of FIG. 1 or any of the power switch devices discussed further below, but may also be used independently therefrom.

Figure 3:
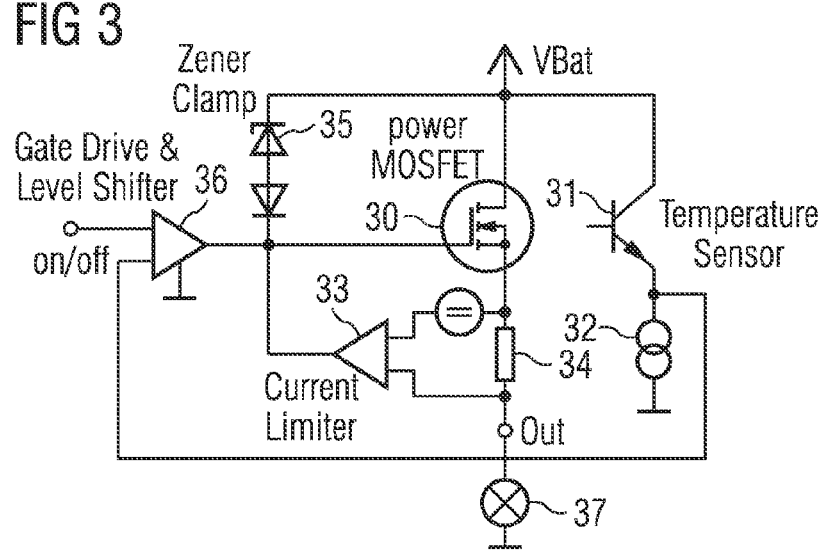
FIG. 3 is a diagram illustrating a power switch device which may form a basis for some embodiments.

In FIG. 3, a power switch device comprising a power switch and various circuitry associated with the power switch is shown. The power switch device of FIG. 3 may form the basis of various embodiments. For example, the power switch device of FIG. 3 may be combined with a overload limit determination like overload limit determination 15 of FIG. 1 in some implementations.

The power switch device of FIG. 3 comprises a MOSFET 30 acting as a power switch to selectively couple a supply voltage, for example a battery voltage VBat, with a load, which load in case of FIG. 3 is represented by a light bulb 37. A gate terminal of power MOSFET 30 is coupled to an output of a gate driver and level shifter 36. Via gate driver and level shifter 36, using an on-off signal the switch may be selectively turned on or off, an "on" state in the context of the present application corresponding to a closed state, and an "off" state corresponding to an open state.

Gate driver and level shifter 36 additionally receives a signal from a temperature sensor, which in the example of FIG. 3 is formed by a transistor 31 and a current source 32. Transistor 31 may be a bipolar transistor, PN junctions of which change their behavior with changing temperature. In other embodiments any other conventional implementation of a temperature sensor may be used.

Furthermore, the power switch device of FIG. 3 comprises a current limiter 33. Current limiter 33 receives a measure of a current flowing via the load terminals of power MOSFET 30 by measuring a voltage drop across a sense resistor 34 and may control the gate terminal of power MOSFET 30 to prevent an overcurrent. Other circuitry may also be provided, for example shunt resistors for current limitation. Furthermore, a Zener diode clamp 35 is provided as an overvoltage protection. It should be noted that the shown power switch devices serve only illustrative purposes, and in other power switch devices, for example only some of the features or elements shown and/or alternative features or elements may be provided.

Figure 4:
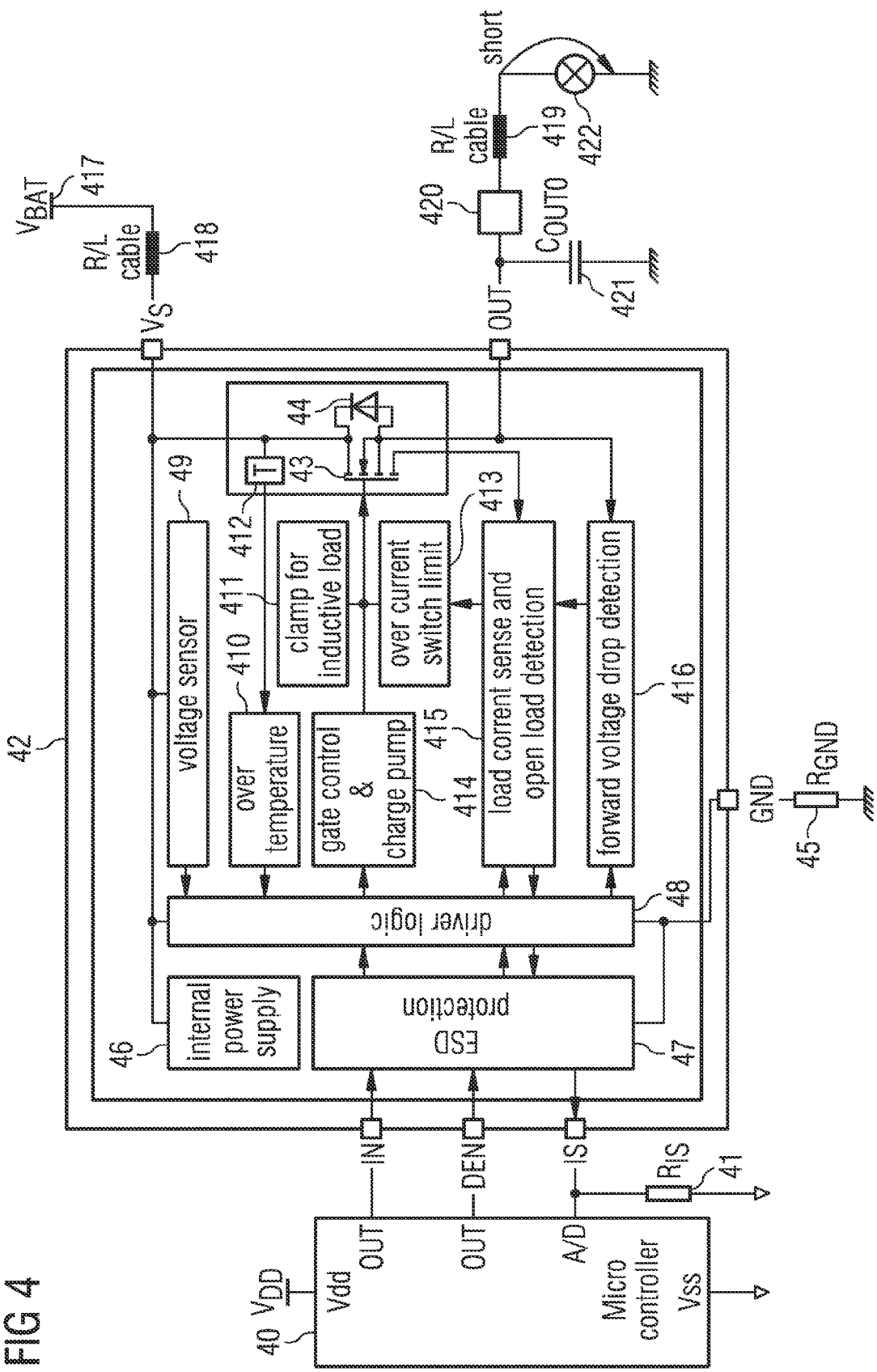
FIG. 4 is a diagram illustrating a power switch device which may form a basis for some embodiments.

In FIG. 4, a further example of a power switch device serving as a basis for embodiments is shown together with associated circuitry. In the example of FIG. 4, a power switch device 42 comprises a power MOSFET 43 as a power switch, which in the example of FIG. 4 serves to couple a supply voltage, for example a battery voltage, 417 with a load 422. In the example of FIG. 4, the load is represented by a light bulb symbol, although other loads may be used as well.

An impedance, in particular resistance and/or inductivity, of a wiring from supply voltage 417 to a supply voltage input of power switch device 42 is labeled 418 in FIG. 4, and an impedance, for example resistance and/or inductivity, of a wiring from an output pad 420 of power switch device 42 to load 422 is labeled 419 in FIG. 4. All elements of power switch device 42 in some embodiments may be implemented on a single chip die, although other embodiments may use more than one chip die. Additionally, an output capacitance 421 may be provided, and power switch device 42 may be coupled to ground via a resistor 45 in some embodiments.

Power switch device 42 may be controlled by a microcontroller 40, which may be coupled with power switch device 42 as shown, including a resistor 41 in the coupling. However, this merely serves as an example.

Signals from microcontroller 40 are provided to a driver logic 48 of power switch device 42 via an ESD protection circuitry 47. Driver logic 48 controls a gate control and charge pump 414, which in turn controls a gate terminal of power MOSFET 43.

Furthermore, power switch device 42 in the embodiment shown comprises a temperature sensor 412, for example as shown in FIG. 3, to detect an overtemperature at overtemperature detection 410. Overtemperature detection 410 is coupled to driver logic 41 and may for example control driver logic 48 to open power MOSFET 43 in case of an overtemperature being detected.

Furthermore, the power switch 42 of the embodiment of FIG. 4 comprises a load current sense and open load detection circuit 415, which may sense a load current. Depending on the load current, driver logic 48 may be controlled to open or close the switch. Furthermore, an overcurrent switch limit 413 may be set upon reaching of which switch 43 may for example be opened. This function may for example correspond to current limiter 33 of FIG. 4.

Furthermore, the power switch device of FIG. 4 may comprise a voltage sensor 49 for monitoring supply voltage 417 and controlling driver logic 48 in response thereto, and a forward voltage drop detection 416 to detect a voltage drop across power switch 43 and again to control driver logic 48 in response thereto.

Furthermore, transistor 43 may have a reverse bias diode 44, either in form of a parasitic diode or in form of a deliberately implemented diode, coupled in parallel to its source and drain terminal, which may form a dissipation path in case of shutdowns. For example, in case of a short circuit of load 422 as illustrated by an arrow in FIG. 4, a high current may be sensed, and overcurrent switch limit 413 may control power switch 413 to open, also referred to as emergency shutdown. In this case, energy stored in inductivities 418, 419 may discharge via diode 44. This in some cases may lead to a comparatively high temperature of power switch 43.

Such short circuits may not only appear due to faulty wiring, faulty loads or other faults, but may also be inherent to certain applications. For example, in case a load like load 47 of FIG. 3 or load 422 of FIG. 4 is a light bulb as illustrated, when first switching on the light bulb, i.e. closing an associated power switch, a filament of the light bulb is still cold. A cold filament of a light bulb typically has a very low resistance, similar to a short circuit. In such a case, power switch 42 may be controlled for example by microcontroller 40 to repetitively retry switching on the light bulb following an emergency shutdown due to overcurrent. In some cases, with each repetition a filament of the light bulb may be heated more, increasing its resistance, until a stable operation is obtained. In some cases, a number of repetitions or retries necessary until a stable state for such a light bulb is reached may depend on a voltage. For example, in automotive applications a supply voltage may not be very stable, leading to variations.

Figure 5:
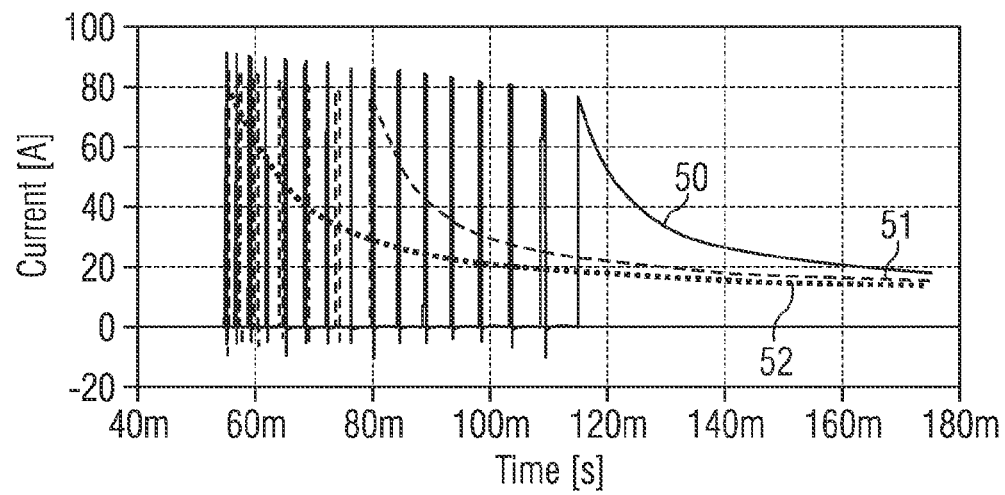
FIG. 5 is a diagram illustrating a behavior of some power switch devices.

Such a behavior is illustrated in FIG. 5. FIG. 5 shows examples for switching on a cold light bulb via a power switch for three different supply voltages. In FIG. 5, the current is plotted versus time. A curve 52 shows the behavior for a relatively low voltage, in which case in an example no emergency shutdown is performed, as a current is below a shutdown limit. A curve 51 shows the behavior for a somewhat higher voltage, where the current (for example due to the higher voltage) exceeds a shutdown limit, which in the present case may be about 80 A, leading to an emergency shutdown. In the example shown, seven repetitions of switching on are needed until a steady operation is reached. Curve 50 shows the behavior for an even higher voltage, where even more repetitions are needed. As can be seen for curves 51 and 50, the current for each repetition slowly decreases compared to the previous try, which is for example due to a filament of a light bulb gradually warming up and thus increasing its resistance, which in turn leads to a lower current.

Figure 6:
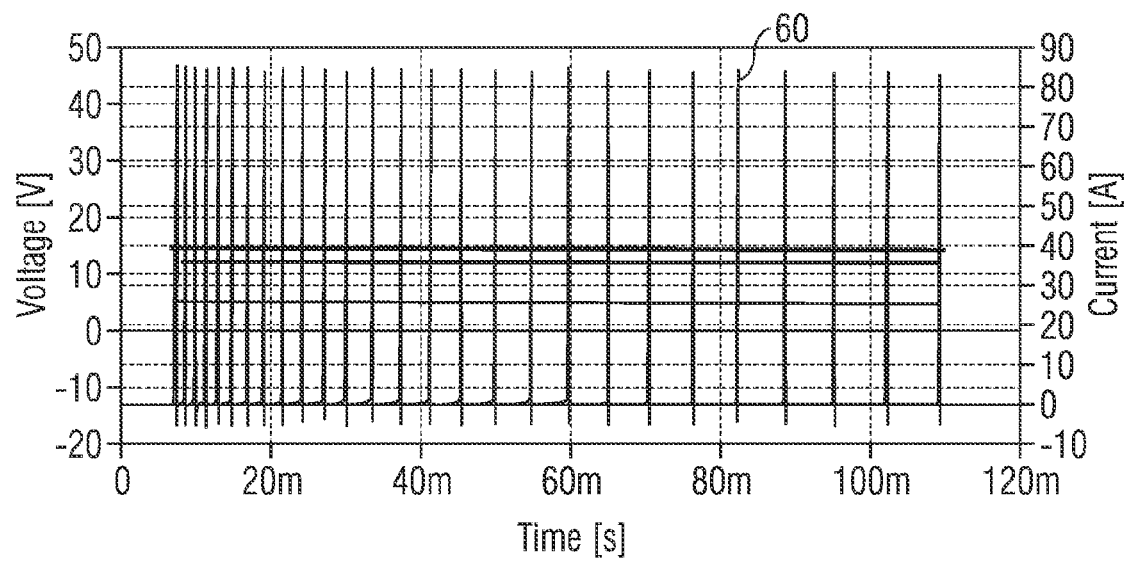
FIG. 6 is a diagram illustrating a behavior of some power switch devices.

In FIG. 6, a curve 60 shows an example behavior in case of a real short circuit. In such a case, many repetitions may be performed, unless a power switch device used has a repetition limit (for example 8 repetitions, 10 repetitions etc.) built in, after which for example a controlling microcontroller like microcontroller 40 of FIG. 4 will stop any further retries and leaves the power switch device permanently open, for example until a reset is applied externally after repair of a short circuited connection.

It should be noted that an overload condition where a switch is applied may be detected by various different measures in embodiment. For example, a temperature of a power switch may be monitored (for example using temperature sensor 31, 32 of FIG. 3 or temperature sensor 412 of FIG. 4). When a temperature limit, for example of the order between 150° C. and 200° C., is exceeded, a power switch may be opened. In other embodiments, a temperature rise may be taken as a criteria, for example a temperature rise exceeding a certain threshold. For example, such a threshold may be between 60 and 100 K, for example about 80 K. In other cases, additionally or alternatively and as already mentioned, a current limit may be used, for example between 60 and 100 A, for example about 80 A. Additionally or alternatively, a voltage drop across a switch use for example a drain-source voltage in case a shield effect transistor is used as a switch, may be taken. In some embodiments, the voltage may only be monitored after a transition phase after turning on and/or after a blanking time. Depending on a technology used, a voltage threshold may for example be of the order of 2 Volts. The above criteria may be combined. For example, a shutdown may be performed, i.e. an opening of a switch, when one of the above-mentioned criteria is met. In other embodiments, only one or some of the above criteria may be used.

Figure 7:
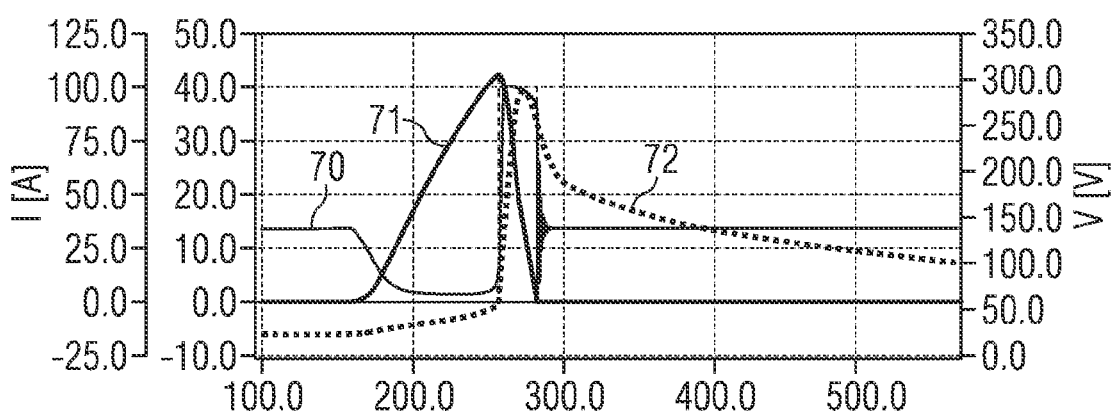
FIG. 7 and FIG. 8 are diagrams illustrating the behavior of some power switch devices during shutdowns.

To illustrate the behavior of various parameters during an overload event, which leads to an emergency shutdown, i.e. opening of a power switch, together with a discharge of energy stored for example in inductivities, FIG. 7 illustrates the behaviors of current, temperature and voltage during such an event. A curve 71 illustrates a load current. At a current of a little bit of over 100 A, an opening of the switch is initiated. A curve 70 illustrates a drain-source voltage over a power switch during the event. Finally, a curve 72 illustrates the temperature of the power switch. As can be seen, due to a discharge (e.g. from inductivities) clamping following the opening of the power switch, the temperature rises significantly. The temperature scale is illustrated on the right of FIG. 7 in walls, by applying a voltage equivalent.

Figure 8:
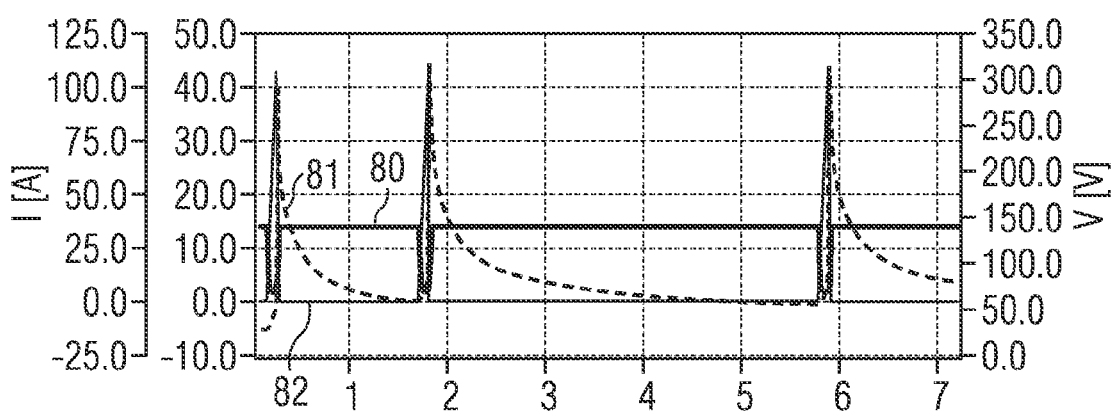

FIG. 8 shows a similar graph as FIG. 7 for three repetitive events. A curve 80 illustrates a drain-source voltage, a curve 81 illustrates a temperature and a curve 82 illustrates a load current. As mentioned, a number of repetitions in some embodiments may be predetermined or may be user-configurable, for example zero (no repetitions), an integer number of repetitions or infinity (i.e. an infinitive number of retries).

As already mentioned, such retries, i.e. repetitions, with the associated temperature rise, may for example shorten the lifetime of a power switch used or lead to failure of the power switch.

In some embodiments, an overload limit, for example a current limit, is adjusted based on an estimated inductivity. For example, for higher inductivities coupled to the power switch, more energy may dissipate during a shutdown event like an emergency shutdown, and therefore in some embodiments a lower limit is used. Conversely, for lower inductivities coupled to the power switch, less energy may be stored in the inductivities and therefore dissipated in case of an opening of the power switch. Therefore, in such cases a higher limit may be employed.

In some embodiments, an inductivity may be estimated based on a duration of a load current during a clamping of the power switch to discharge for example inductivity or an avalanche breakdown of a diode like diode 44 of FIG. 4 for this discharge. The current during such a clamping may be estimated with the following first order model.

$$I_D(t) = \frac{1}{R_{load}} \left( L_{load} \frac{dI_D(t)}{dt} + V_{CL} - V_{bat} \right) \quad (1)$$

In equation (1), $I_D$ is as a drain current, t is the time, $R_{load}$ is a load and inductor resistance, $L_{load}$ is the inductivity, $V_{CL}$, is a clamp voltage and $V_{bat}$ is a supply voltage like supply voltage 417 of FIG. 4 or supply voltage 11 of FIG. 1. Through integration, a clamp time $t_{CL}$ may be written according to $$t_{CL} = \frac{L_{load}}{R_{load}} \ln\left(1 + \frac{I_{pk} R_{load}}{V_{CL} - V_{bat}}\right), \quad (2)$$

where $I_{pk}$ is a peak current flowing during the clamping. Equation (2) may be approximated as $$t_{CL} \cong L_{load} \frac{I_{pk}}{V_{CL}} \quad (3)$$

From equation (3), an estimation for the load $L_{load}$ according to $$L_{load} \cong t_{CL} \frac{V_{CL}}{I_{pk}} \quad (4)$$

may be derived. The peak current $I_{pk}$ may be predetermined due to a threshold. The clamp voltage $V_{CL}$ may for example follow from the design of the power switch, i.e. may be an inherent property of the power switch in embodiments. In such cases, therefore by measuring the clamp time $t_{CL}$, the load inductivity $L_{load}$ may be estimated according to equation (4).

Figure 9:
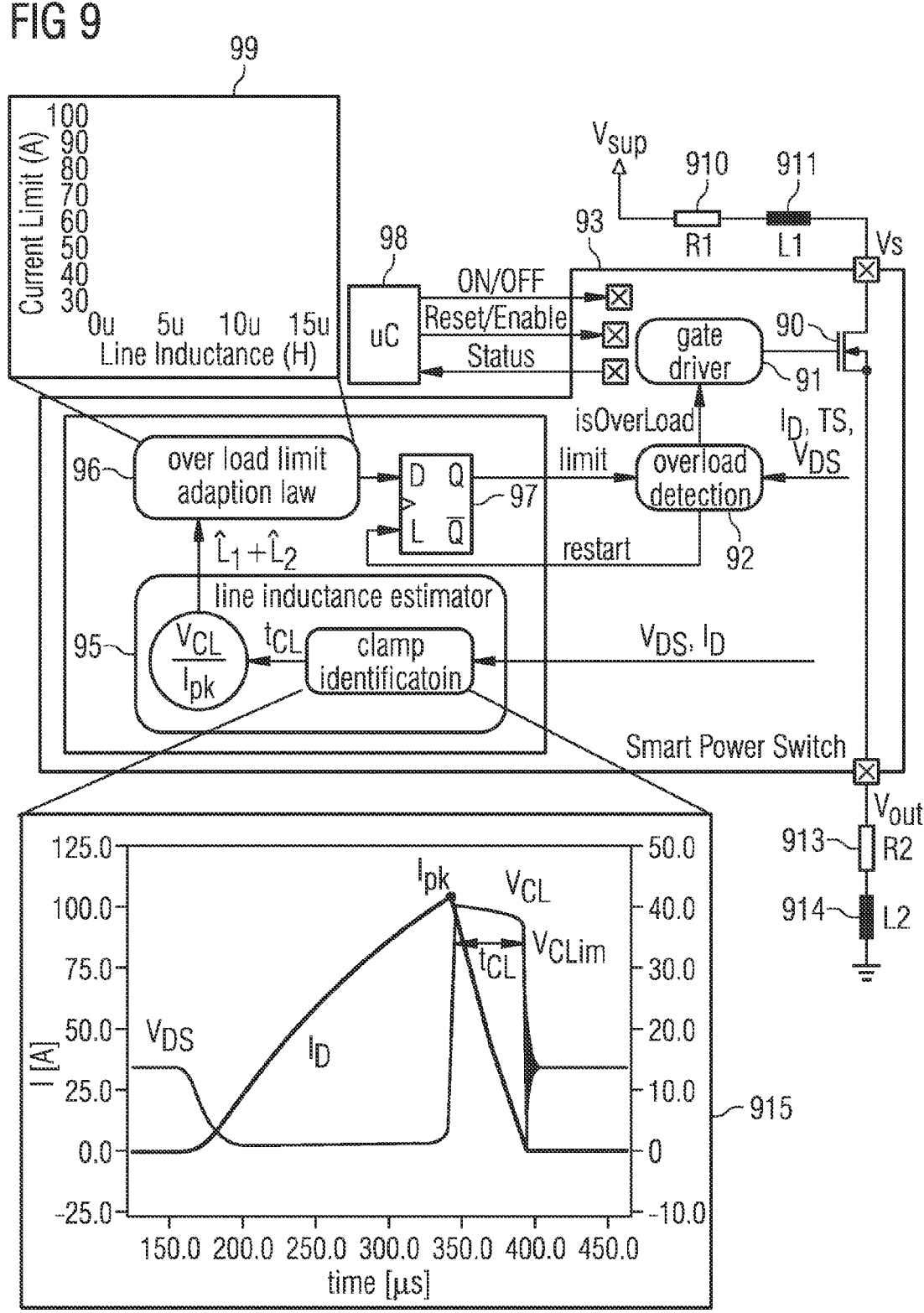
FIG. 9 is a schematic diagram illustrating a power switch device according to an embodiment.

In embodiments, based on the estimated load then a shutdown threshold, for example a current limit, may be adjusted or determined. An illustrative embodiment using such techniques is schematically illustrated in FIG. 9. In FIG. 9, a power switch device is schematically illustrated which uses an adaptable overload limit based on an estimated inductivity. In FIG. 9, for clarity's sake, mainly components associated with the adjustment of an overload limit are depicted. However, the embodiment of FIG. 9 may include further features, for example one or more of the features of power switch devices illustrated with reference to FIGS. 1, 3 and/or 4.

The power switch device of FIG. 9 comprises a field effect transistor 90 as a power switch. A source terminal of field effect transistor 90 is coupled with a supply voltage $V_{sub}$, a resistance of the wiring to the supply voltage $V_{sub}$ being represented by a resistor 910 and an inductance being represented by an inductivity 911. A drain terminal of field effect transistor 90 is coupled with a load. A resistance of wiring to the load and possibly of the load itself is symbolized by a resistor 913, and a corresponding inductance is represented by an inductivity 914.

The power switch device comprises an overload detection circuit 92 which detects an overload condition, for example as already explained above (for example by monitoring a current, temperature, a drain-source voltage etc.). In case of a detected overload, overload detection circuit 92 controls a gate driver 91 to open switch 90.

Power switch device 93 may be controlled by a controller like a microcontroller 98, which may for example control opening and closing of the power switch device during normal operation (for example outside of overload conditions).

Furthermore, power switch device 93 comprises an overload limit adaptation circuit 94 to adapt an overload limit based on an estimated inductivity. Overload limit adaption circuit 94 receives information about a drain current $I_D$ and/or a drain-source voltage $V_{DS}$ to identify a clamping event, as for example illustrated in FIG. 7, and also to estimate the inductance. As schematically shown in diagram 915, the clamping voltage $V_{CL}$ corresponds to the source drain voltage $V_{DS}$ during clamping.

For identification of a clamp, for example the typical waveforms already discussed with reference to FIG. 7 and as shown again in an inset 915 of FIG. 9 may be used, or a signal from overload detection 92 may be used to indicate a clamping event. Line inductance estimator 95 may measure a time where the source drain voltage $V_{DS}$ is above a predetermined threshold $V_{CLIM}$ as a clamping time $t_{CL}$. Clamping may also be detected by the source drain voltage exceeding this predetermined threshold. A peak current $I_{pk}$ may be determined as a peak of current $I_D$, or may be set to a current overload limit in case a current value is used as a limit. Furthermore, line inductance estimator 95 may set the clamping voltage $V_{CL}$ to a predetermined value based on a current threshold, or may determine $V_{CL}$ as a maximum of $V_{DS}$ during a clamping event.

Based on these parameters, according to equation (4) line inductance estimator 95 estimates an inductance coupled to the power switch device, labeled $\hat{L}_1 + \hat{L}_2$ in FIG. 9 and representing an estimate of the sum of inductances 911, 914. As indicated by 96, based on some overload limit adaptation law the overload limit is then adapted to the estimated inductance.

For example, a lookup table storing a relationship between the estimated line inductance and an overload limit like a current limit may be stored and used for the adaptation of the overload limit, as indicated by an inset 99 in FIG. 9. For example, in some embodiments a "clamp energy" $E = (L/2) \times I_{pk}^2$ may be kept constant or even reduced by adapting an overcurrent limit corresponding to $I_{pk}$ to the inductance L. In other words, for a higher estimated inductivity a current limit may be reduced. Other approaches may be used as well, for example a linear relationship between overload limit and estimated inductance.

Figure 10:
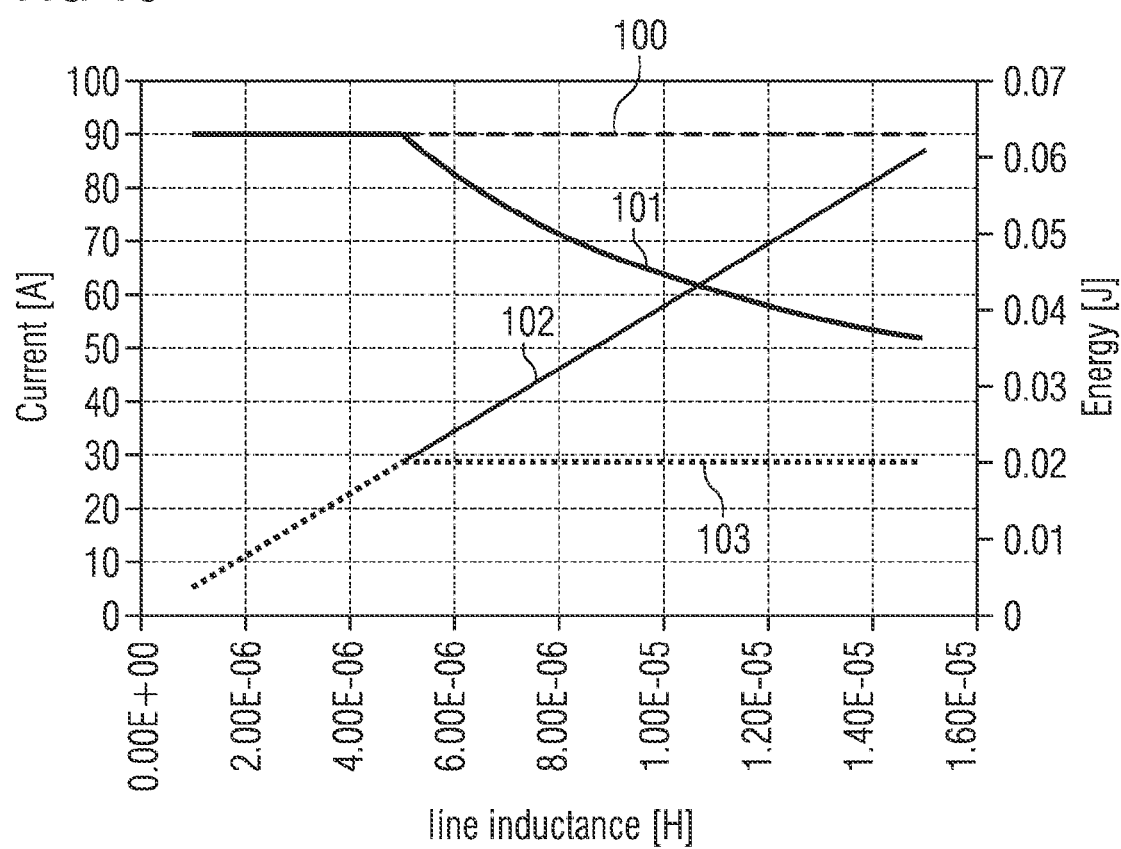
FIG. 10 is a diagram illustrating overload limits usable in some embodiments.

An example where a total energy is kept constant after the inductance estimated reaches a certain threshold value is schematically shown in FIG. 10. In FIG. 10, a curve 100 shows an original current limit, as an example at 90 A, for all inductances. A curve 101 shows a current limit after adaptation. For estimated inductances exceeding about 5 μH, the current limit is reduced following a quadratic curve so as to keep the energy constant. A curve 102 shows the energy for a constant limit according to curve 100. Here, the energy increases linearly with inductance. A curve 103 shows the energy with a limit according to curve 101 applied. Here, the energy is kept constant for inductivities exceeding about 5 µH.

Figure 11:
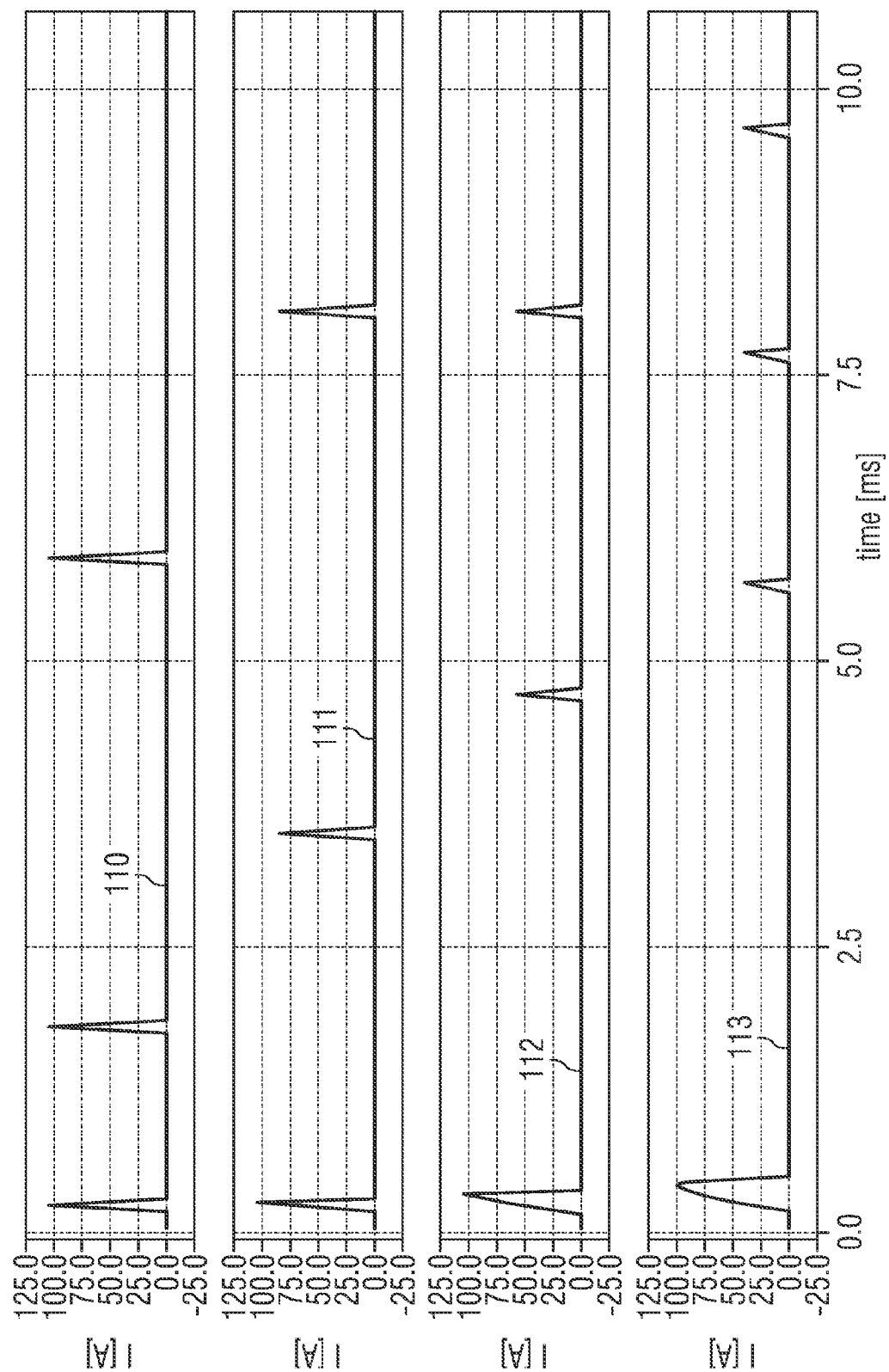
FIGS. 11 and 12 are diagrams illustrating the behavior of power switch devices of some embodiments.
Figure 12:
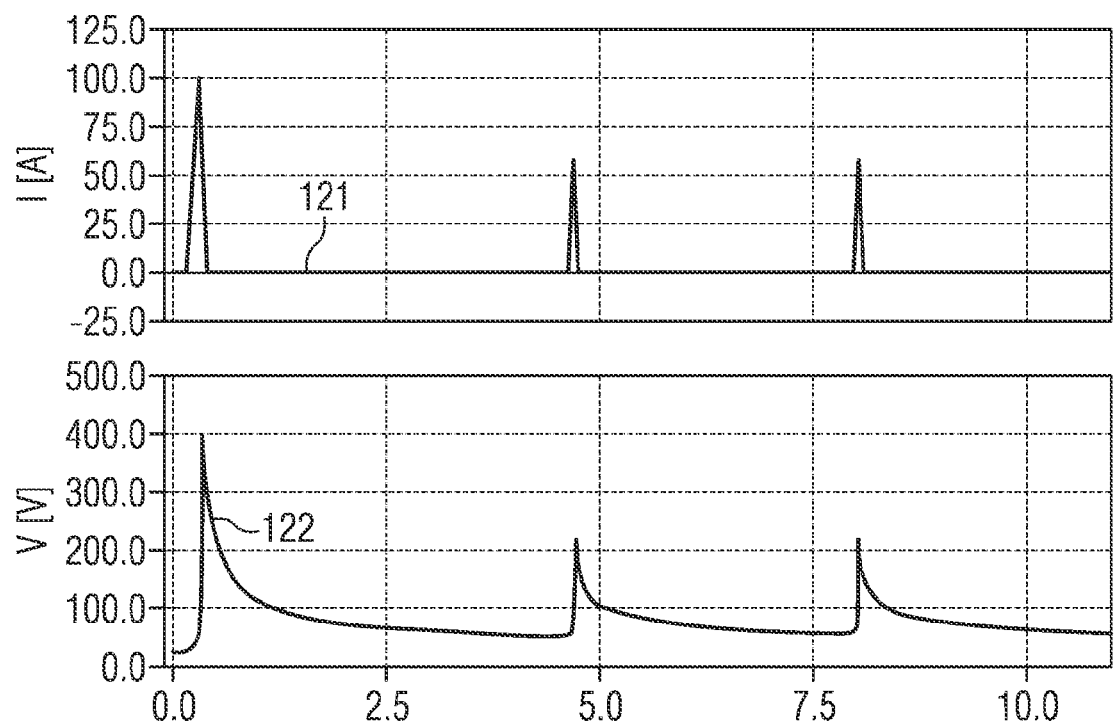

To illustrate this further, in FIGS. 11 and 12 examples illustrating the behavior of a power switch according to an embodiment using for example limits as shown in FIG. 10 are illustrated. FIG. 11 illustrates a current for four different inductivities. For the example of FIG. 11, it is assumed that the threshold where a reduction of the overload limit begins is about 5 µH, as also used in FIG. 10. It is to be emphasized again that any numerical values are given only for illustration purposes, and depending on the implementation other values may apply.

A curve 110 shows an example behavior for an estimated inductivity below a threshold. Here, a same limit applies to all retries.

A curve 111 represents the behavior with an inductivity slightly above a threshold where a current limit is adjusted. As can be seen, the second and third peaks in curve 111 are slightly below the first peak value, due to a reduced current limit.

Curve 112 illustrates the behavior for an even higher inductivity, for example about 9 µH. Here, the current limit is reduced further, leading to smaller second and third peaks. Finally, a curve 113 illustrates the restart behavior of the drain current with an even higher estimated inductance, for example about 13 µH. Here, the peaks after the first peak are reduced even further. It should be noted that in the example of FIG. 11 the height of the first peak is approximately equal for all curves 110-113, as the first peak, i.e. the first shutdown, is used for estimating the inductance as already briefly explained with reference to FIG. 9.

The reduction of the current limit leads to a reduction for example of a temperature increase of a power switch. This is illustrated in FIG. 12. A curve 121 in FIG. 12, similar to the curve of FIG. 11, shows the behavior of a drain current. A curve 122 illustrates a corresponding behavior of the temperature of a power switch like a MOS transistor. As can be seen from FIG. 12, the temperature for the second and third peaks is significantly reduced, which may increase lifetime of a power switch device.

In particular, in embodiments through the decreasing for example of the current limit (or another limit like voltage limit or temperature limit) based on the inductivity, an energy dissipated in the power switch device may be kept in a range which is less likely to cause failure of the device in some embodiments.

Figure 13:
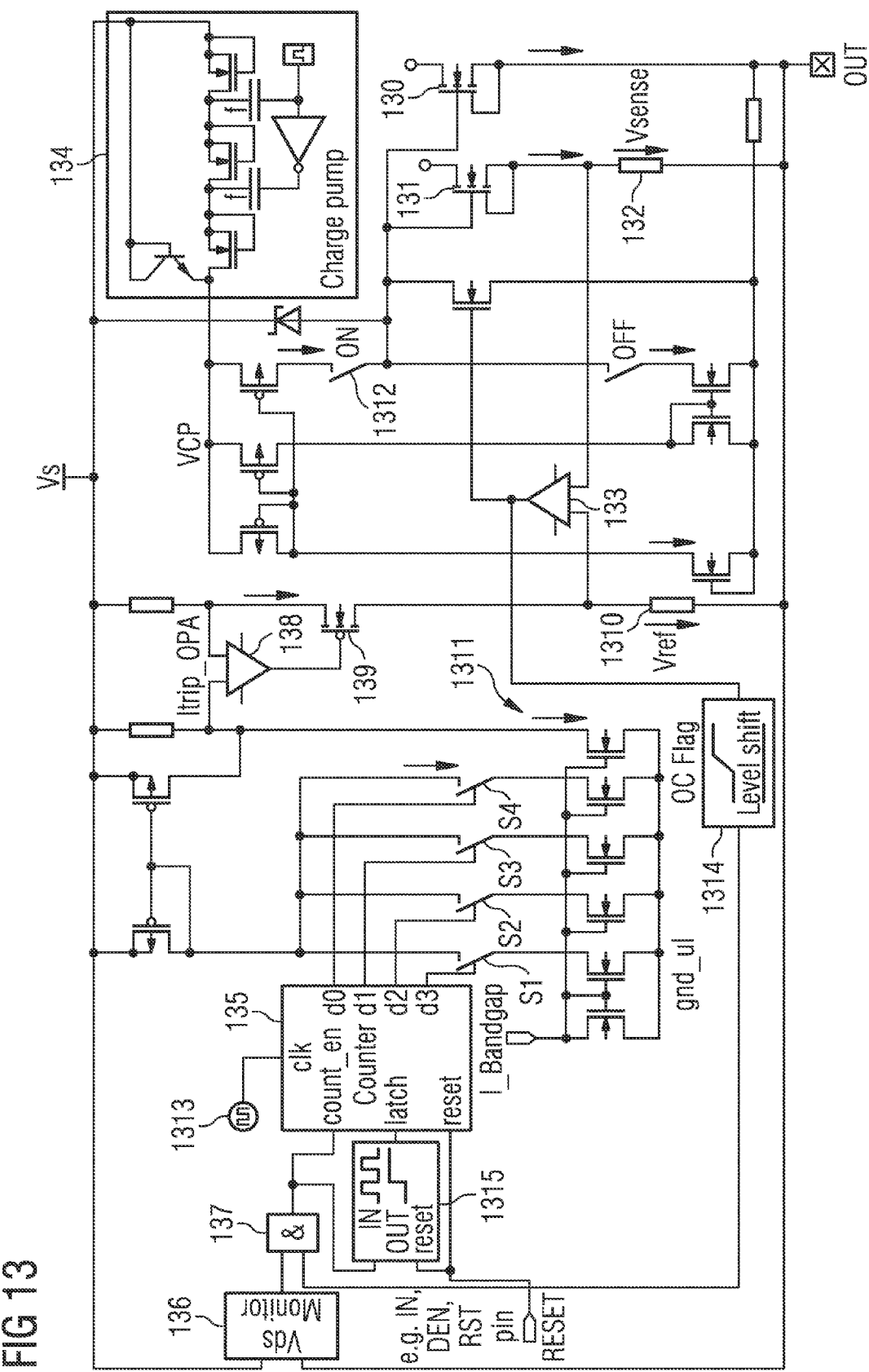
FIG. 13 is a circuit diagram example illustrating a power switch device according to an embodiment.

For further illustration, FIG. 13 illustrates an example circuit implementation of a power switch device according to an embodiment. While numerous details are shown in FIG. 13, in other implementations other devices, components or techniques may be used.

The power switch device 130 comprises a MOS transistor 130 acting as a power switch. A charge pump 134 serves to drive a gate terminal of transistor 130 via a control switch 1312, via which the power switch may be selectively opened and closed.

To sense a drain current of MOS transistor 130, a scaled transistor 131 is provided which is scaled with respect to transistor 130 (i.e. for example has smaller dimensions like gate dimensions). For example, a size ratio (scaling factor) between transistors 131 and 130 may be in the order of 1:10000, although other values may be used as well. This implies that a drain current of transistor 131 is smaller than a drain current of transistor 130 by the scaling factor. For example, for a scaling of 1:10000 as used above, a current of 90 A flowing via transistor 130 would correspond to a current of 9 mA flowing via transistor 131. This current via transistor 131 is measured using a sense resistor 132. A voltage drop of transistor 132 corresponding to the current is fed to a first input of a comparator 133.

Furthermore, a reference current setting a threshold value flows via a resistor 1310. To reduce power dissipation, for example the reference current may be of the order of some tens of microamperes. A voltage drop at resistor 1310 corresponds to a current limit and is fed to a further input of comparator 133.

When the current sensed via resistor 132 exceeds a threshold determined by the reference current flowing via resistor 1310, an output signal of comparator 133 opens power switch 130 to prevent overload.

As will be explained now in the following, the reference current and therefore the current limit may be adjusted based on an estimated inductivity coupled to the power switch.

A VDS monitor 136 monitors a drain-source voltage of switch 130. In case the drain-source voltage exceeds a predetermined threshold, VDS monitor 136 may for example output a logic value indicating the threshold being exceeded. This voltage threshold may for example correspond to the voltage $V_{CLlim}$ discussed with reference to FIG. 9. The output of VDS monitor 136 is coupled to an AND-gate 137. Furthermore, AND-gate 137 via a level shifter 1314 receives the output of comparator 133. Level shifter 1314 serves to convert the output of comparator 133 to logic levels appropriate for AND-gate 137. With the configuration described, AND-gate 137 in the embodiment of FIG. 13 outputs e.g. a logic 1 for example in case the drain-source voltage exceeds a predetermined threshold and an emergency shutdown due to exceeding of the current level has been performed by comparator 133. In this case, a counter 135 as indicated by a box 1315 counts a time duration during which this condition lasts, for example clocked by a clock signal 1313, which may have for example a frequency of the order of 5 MHz, although other values may be used as well. This counting essentially corresponds to a measurement of the time $t_{CL}$ mentioned above.

Depending on the counting, i.e. the time duration, in the embodiment of FIG. 13 counter 135 outputs a 4 bit signal D0-D3 acting on four switches S1-S4 coupled with respective current sources. The current sources in turn are coupled to a band gap voltage. The current sources and switches therefore serve as a simple digital-to-analog converter 1311, converting the digital output of counter 135 to a current. Via an operational amplifier 138, a total current output by these current sources controls a transistor 139, which in turn controls the above-mentioned reference current. Therefore, depending on the time duration (which as explained above is dependent on an inductive load) the reference current and therefore the current limit is adjusted.

In FIG. 9, the new overload limit is then forwarded to overload detection 92 for example via a latch 97.

As already mentioned, other techniques, for example a lookup table, are equally possible.

Furthermore, in the embodiment of FIG. 13 some current mirrors, in particular PMOS current mirrors, are used. In some embodiments, the measurement of the time as described above may only be performed during a first shutdown of a series of shutdowns, for example in configurations where the inductivity does not change between shutdowns.

For resetting the counter 135, a reset pulse may be applied, upon which an original current limit is reestablished.

As already mentioned above, apart from current limits techniques disclosed herein may also be applied to other limits like temperature limits or voltage limits.

Furthermore, as already emphasized the embodiments described and shown serve only as non-limiting examples, and other embodiments may also be used.

What is claimed is:

1. A power switch device, comprising:
a power switch,
an overload control adapted to open the power switch when a quantity related to the power switch exceeds a predetermined threshold, and
an overload limit determination circuit adapted to adjust the predetermined threshold based on an inductivity coupled to the power switch to keep a clamp energy discharged after opening the switch at or below a predetermined value.

2. The power switch device of claim 1, wherein the quantity comprises at least one quantity selected from a group consisting of a current flowing via the power switch, a voltage drop across the power switch or a temperature of the power switch.

3. The power switch device of claim 1, wherein the overload limit determination circuit is adapted to estimate the inductivity coupled to the power switch and to adjust the predetermined threshold based on the estimated inductivity.

4. The power switch device of claim 3, wherein the overload limit determination circuit is configured to estimate the inductivity based on a time duration of a clamping following an overload.

5. The power switch device of claim 3, wherein the overload limit determination circuit comprises a lookup table to convert the estimated inductance into an overload limit.

6. The power switch device of claim 1, wherein the overload limit determination circuit is adapted to adjust the overload limit after a first opening of the power switch due to an overload of a series of openings of the power switch.

7. The power switch device of claim 1, wherein the overload limit determination circuit comprises a counter adapted to measure a time duration of a voltage across the power switch exceeding a predetermined voltage after the power switch has been opened.

8. The power switch device of claim 1, wherein the overload limit determination circuit comprises an analog-to-digital converter.

9. The power switch device of claim 1, wherein the power switch comprises a field effect transistor.

10. The power switch device of claim 1, further comprising a control circuit to control the power switch device to close the power switch again after the power switch has been opened due to an overload.

11. The power switch device of claim 1, wherein the overload control comprises a comparator.

12. A method of operating a power switch, comprising:
estimating an inductance coupled to the power switch device, and
setting an overload limit based on the inductance,
wherein estimating the inductance comprises measuring a time duration of a discharge following an opening of the power switch due to overload.

13. The method of claim 12, wherein measuring the time duration comprises measuring a duration during which a voltage across the power switch exceeds a predetermined threshold.

14. The method of claim 12, wherein the measured time is taken as a measure for the inductivity.

15. The method of claim 12, wherein the inductivity is estimated according to $L=t_{CL} \times V_{CL}/I_{pk}$, wherein $t_{CL}$ is the measured time, $V_{CL}$ is a voltage across the power switch device during the time duration, and $I_{pk}$ is a peak current.

16. The method of claim 12, wherein setting an overload limit comprises setting a current limit.

17. A power switch device, comprising:
a switch transistor,
a further transistor coupled parallel to the switch transistor and scaled with respect to the switch transistor, a load terminal of the further transistor being coupled with a sense resistor and an input of a comparator,
a further input of the comparator being coupled to a reference resistor, and
a reference current adjustment circuit adapted to adjust a reference current to the reference resistor based on an inductivity coupled to the switch transistor, the reference current adjustment circuit being configured to estimate the inductivity based on a time duration of a clamping following an opening of the switch due to overload.

18. The power switch device of claim 17, wherein the reference current adjustment circuit comprises a counter coupled with a monitoring circuit monitoring a voltage between load terminals of the switch transistor.

19. The device of claim 18, further comprising a digital-to-analog converter coupled with the counter.

* * * * *